United States Patent [19]

Schneider

[11] Patent Number: 5,331,831
[45] Date of Patent: Jul. 26, 1994

[54] HARDWARE SENSOR

[75] Inventor: Richard J. Schneider, Rosemount, Minn.

[73] Assignee: Bermo, Inc., Circle Pines, Minn.

[21] Appl. No.: 33,834

[22] Filed: Mar. 19, 1993

[51] Int. Cl.[5] ............................................ B21J 15/28
[52] U.S. Cl. ..... 72/4; 72/21; 72/26; 72/391.2; 29/818; 29/243.53
[58] Field of Search ..................... 72/4, 21, 26, 391.2, 72/391.4, 1, 2; 29/818, 243.53, 243.54

[56] References Cited

U.S. PATENT DOCUMENTS

| | | |
|---|---|---|
| H277 | 5/1987 | Lee et al. |
| 3,452,418 | 7/1969 | Ernest et al. ........................... 29/818 |
| 3,729,047 | 4/1973 | Bohnlein et al. ..................... 164/150 |
| 4,509,858 | 4/1985 | Smythe et al. ....................... 356/358 |
| 4,733,457 | 3/1988 | Tega et al. ............................ 29/709 |
| 4,750,272 | 6/1988 | Caddell ................................ 33/639 |
| 4,765,057 | 8/1988 | Muller ................................. 29/716 |
| 4,790,069 | 12/1988 | Maruyama et al. .................. 29/832 |
| 4,791,715 | 12/1988 | Lovelace ............................. 29/464 |
| 4,802,357 | 2/1989 | Jones ..................................... 72/21 |
| 4,876,791 | 10/1989 | Michaud et al. ...................... 29/840 |
| 5,086,965 | 2/1992 | Marsteller et al. ..................... 72/26 |
| 5,107,846 | 4/1992 | Atlas .................................. 128/666 |
| 5,122,782 | 6/1992 | Kawahara ........................... 340/540 |
| 5,168,736 | 12/1992 | Enneper et al. ......................... 72/4 |
| 5,209,091 | 5/1993 | Koenigbauer et al. ................. 72/26 |

FOREIGN PATENT DOCUMENTS

| | | |
|---|---|---|
| 3715905 | 12/1988 | Fed. Rep. of Germany ............ 72/4 |
| 58-34730 | 3/1983 | Japan . |
| 61-189403 | 8/1986 | Japan . |
| 1253-693 | 8/1986 | U.S.S.R. . |

Primary Examiner—David Jones
Attorney, Agent, or Firm—Merchant, Gould, Smith, Edell, Welter & Schmidt

[57] ABSTRACT

The present invention is an apparatus for detecting fault conditions, such as missing or improper hardware, in the operation of a fastener press. It includes a workpiece die that is aligned with and cooperates with a punch assembly in the insertion of the fasteners into holes in the workpiece. The die has a linear displacement member mounted for reciprocal movement in response to the operation of the punch assembly. The position of the linear displacement member, which represents whether or not a fault condition exists, is detected and an alarm indication is generated when there is a fault.

9 Claims, 7 Drawing Sheets

HARDWARE SENSOR

BACKGROUND OF THE INVENTION

This invention relates to an automated press for semi-automatically installing fasteners, such as clinch nuts end standoffs, in a workpiece. The workpiece may be a sheet metal plate used to fabricate the cabinets or chassis electrical equipment. Normally holes are pre-punched in the sheet where the fasteners are to be inserted. The press has a punch assembly adapted to engage the fasteners and ram the fasteners into the pre-punched holes. The press has a fastener dispensing assembly for delivery of the fasteners to the punch assembly. The punch assembly cooperates with an anvil or die on which the sheet is mounted. The die has a spring-biased alignment pin. The press operator places the sheet so that the spring-biased pin extends through a pre-punched hole. The punch assembly is then activated whereby it captures a fastener. Continuing its insertion stroke, the punch assembly with captured fastener engages the spring-biased pin forcing the pin to a retracted position and the fastener is secured in the hole.

The above describes a prior art automated fastener press. U.S. Pat. No. 3,452,418 provides a more detailed description of a prior art press of this type.

Upon occasion, a fastener may not be properly seated in the workpiece. For example, a fastener may not have been properly fed to the punch assembly and therefore not be present when the punch assembly is activated. Another fault condition occurs when an improper fastener, such as one that is of the wrong length for the particular operation, is fed to the punch assembly. Also the sheet or workpiece may not have been properly positioned causing the fastener to pierce its own hole either partially or entirely. Unless the operator visually notices the fault condition, it would not become apparent until the workpiece was subsequently used for its intended purpose such as assembly as a cabinet for electronic equipment. At that point the workpiece which by then has been formed to its proper configuration may have to be scrapped in its entirety because of the missing, improperly located, or improper hardware. It is quite common for the press operator to fail to detect or notice these fault conditions. The operator is required to conduct a number of repetitive operations in a short period of time and may lose the concentration required to detect a fault. Moreover, the operator may become distracted. A defective workpiece can cause a considerable number of problems as one attempts to complete a more complex assembly with the defective part. The actual loss can be much greater than simply the defective part. Despite a recognition of this problem from the prior art, there has been no adequate solution developed until the present invention.

SUMMARY OF THE INVENTION

The present invention is an apparatus that detects the fault conditions of improper or missing fastener installation automatically and without relying upon observations made by the operator. The detection apparatus uses the linear displacement of the spring-biased alignment pin of the die to determine correct or fault operating conditions. More specifically, the die in the present invention is a tubular member with the spring-biased alignment pin extending from one end. A linear displacement member is mounted within the tubular member and projects from its end opposite the alignment pin and is also mounted for reciprocal movement along the axis of the die. There is provided a means to transmit the movement of the receiving pin to the displacement member. In the preferred embodiment, the displacement member includes a rod slidably received within the tubular die. The rod is in contact with the alignment pin and therefore moves in concert with the pin. A sensor detects the position of the linear displacement member. In the preferred embodiment, the sensor may be an ultrasonic or photoelectric proximity sensor. An electrical signal generated by the sensor is then processed to determine whether a fault operation has occurred. In the preferred embodiment, if a fault condition is detected, an audible/visual alarm signals the operator and, in addition, the fastener press is disabled so that the operator cannot continue until the fault condition is addressed and corrected.

The present invention thus solves the problem in the prior art through the automatic detection of a fault condition. Fault detection is not dependent upon the somewhat unreliable visual observations of the operator. Further, upon detecting the fault condition, the operator cannot continue to operate the press until the fault is corrected. The present invention thus substantially eliminates the prior art problem of production of defective workpieces. These and other advantages of the invention will become apparent with reference to the accompanying drawings, detailed description of the preferred embodiment and the claims.

DETAILED DESCRIPTION OF THE PREFERRED EMBODIMENT

Figure 1:
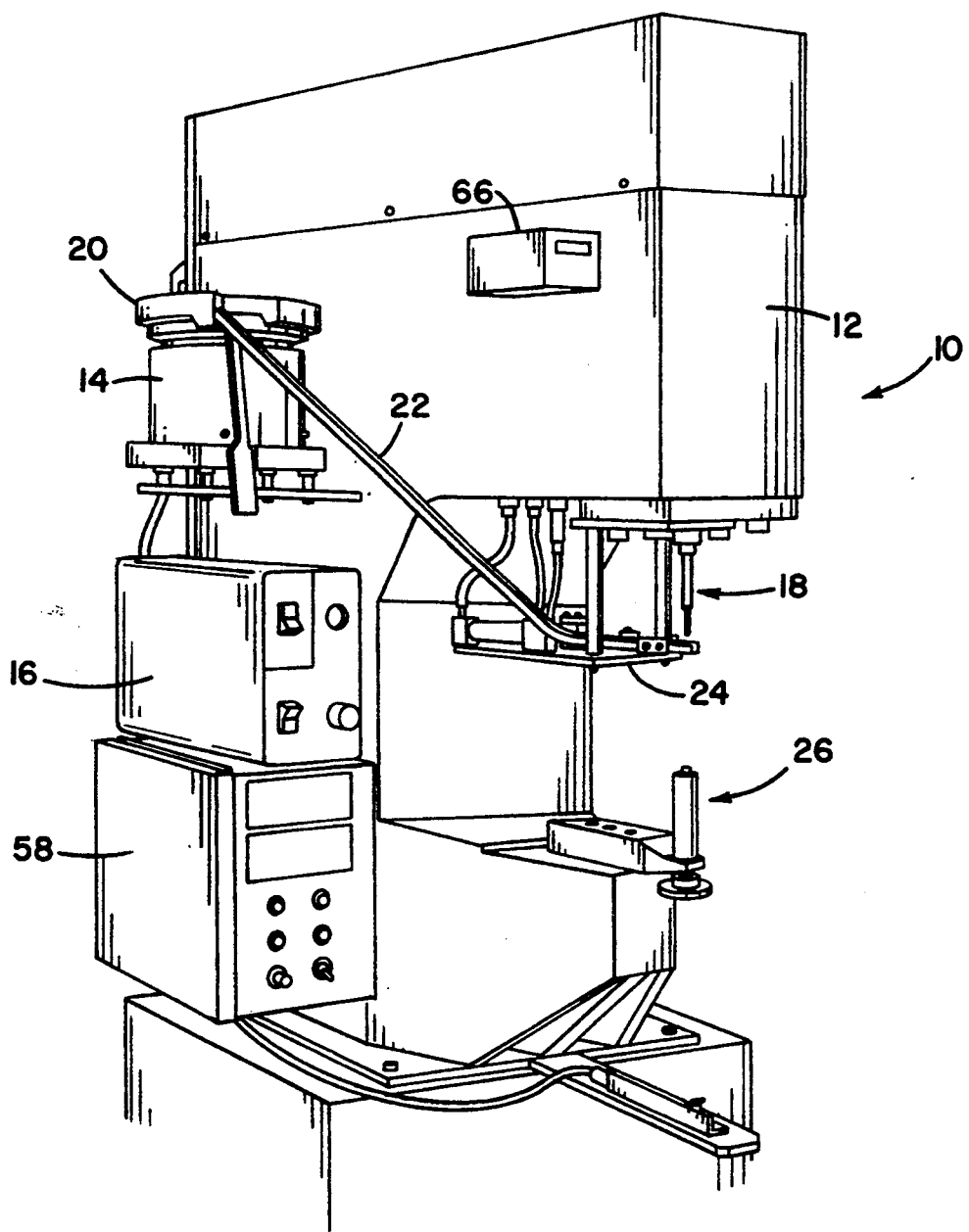
FIG. 1 is a view in perspective of an automated fastener press having fault detection in accordance with the present invention.

Referring to the drawings, wherein like numerals represent like parts throughout several views, an automated fastener press incorporating the present invention illustrated at 10. Press 10 includes a housing 12 for hydraulic and pneumatic circuitry, a fastener feed hopper assembly 14, an electrical control panel 16 containing part of the machine controls and a punch assembly 18. Fastener press 10 is of the type described and illustrated in U.S. Pat. No. 3,452,418, the disclosure of which is incorporated herein by reference. A commercially available fastener press of the type disclosed in the '418 patent is sold by Pemsetter under the designation PS500 series. This apparatus is only one example of commercially available fastener presses to which the present invention has application. The function and operation of such automated fastener presses are well known in the prior art.

Figure 2:
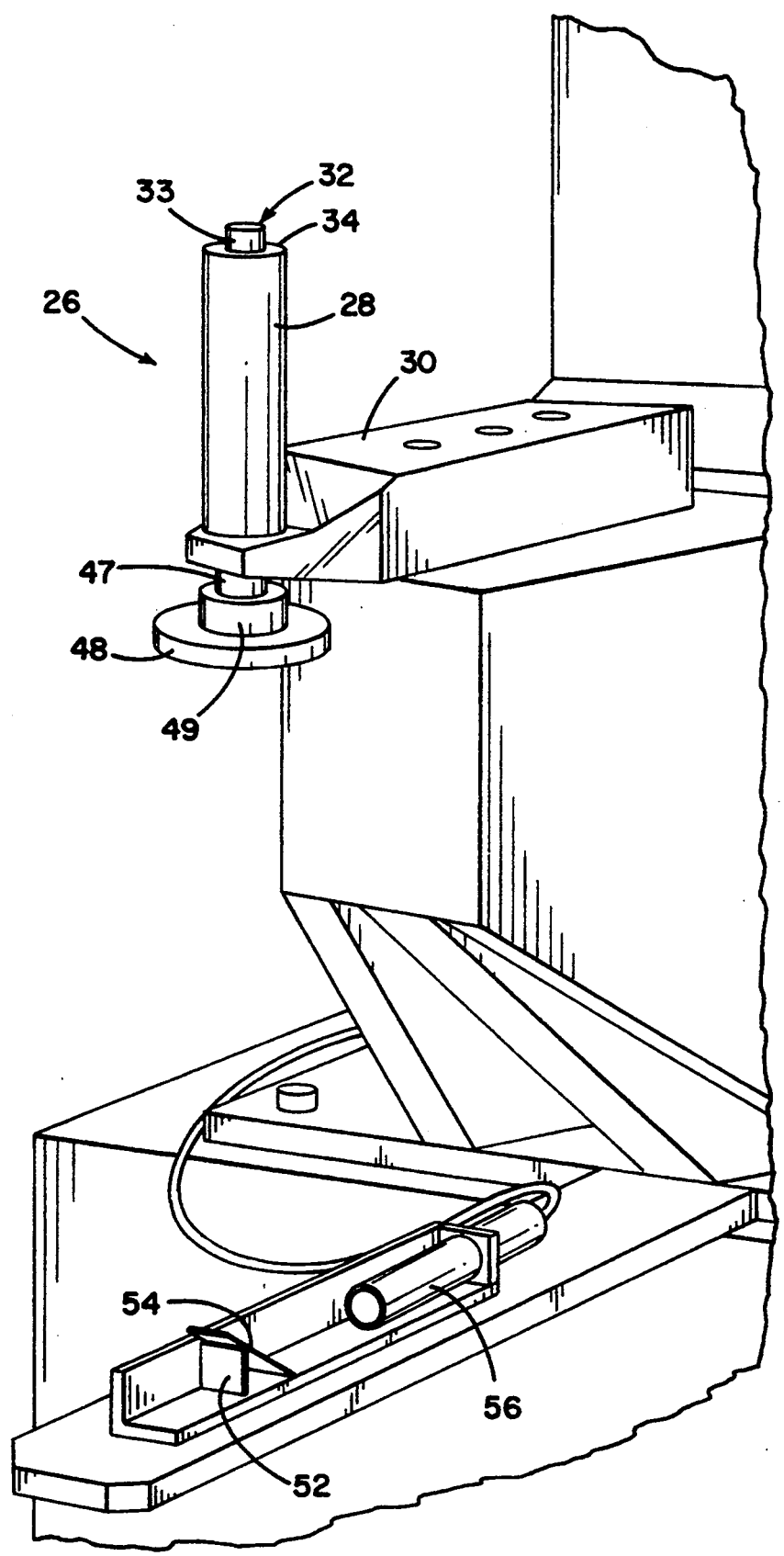
FIG. 2 is a partial view in perspective of the detection apparatus.

Feed hopper assembly 14 includes a feed hopper 20 in which the fasteners are held. A track 22 delivers the fasteners from feed hopper 20 to a gate assembly 24. As described in more detail in the aforementioned '418 patent, gate assembly 24 delivers a fastener to punch assembly 18. An anvil or die assembly 26 is mounted to housing 12 below punch assembly 18. Die assembly 26 is shown in more detail in FIGS. 2 and 3. Die assembly 26 includes a tubular member 28 affixed to a mounting block 30. A spring-bias retractable pin 32 extends from an upper end 34 of tubular member 28. As shown in FIG. 4 biasing spring 36 urges pin 32 into a position projecting above upper end 34. To install a fastener upon a workpiece, the workpiece with a suitable pre-punched hole is placed on die assembly 26 with pin 32 extending through the pre-punched hole. FIG. 4 shows a workpiece 38 placed in the proper position for insertion of a fastener 40 into a pre-punched hole.

Mounted within tubular member 28 and extending from a bottom end 42 thereof is a linear displacement member 44. Linear displacement member 44 includes a rod 46 slidably received within tubular member 28 for reciprocal movement therein along the central longitudinal axis of member 28. A disk 48 is attached to rod 46 and has a planar reflective surface 50. Disposed beneath reflective surface 50 is a reflective member 52 which has a reflective surface 54. A proximity sensor 56 is mounted in alignment with reflective surface 54 so that a signal from proximity sensor 56 can be transmitted to reflective surface 50 and a return signal received from reflective surface 50. Proximity sensor 56 may be an ultrasonic or photoelectric sensor which are well known in the prior art. A signal received by proximity sensor 56 is representative of the position of displacement member 44. As described in more detail hereafter, this signal is processed to provide an indication of the operating condition of the automated press, i.e. whether it is operating properly or there exist a fault condition as described above.

Figure 3:
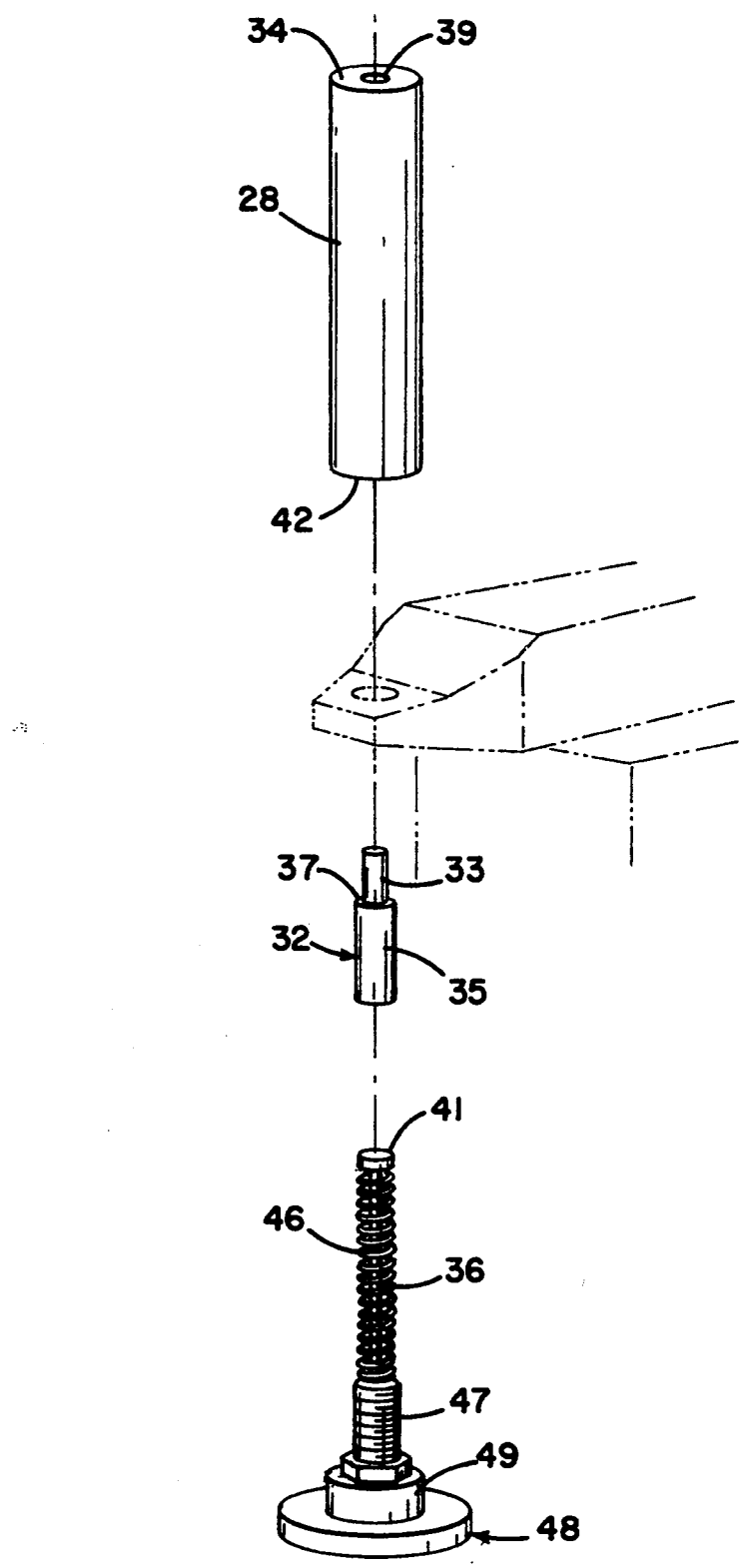
FIG. 3 is an exploded partial view in perspective of the detection apparatus.
Figure 4:
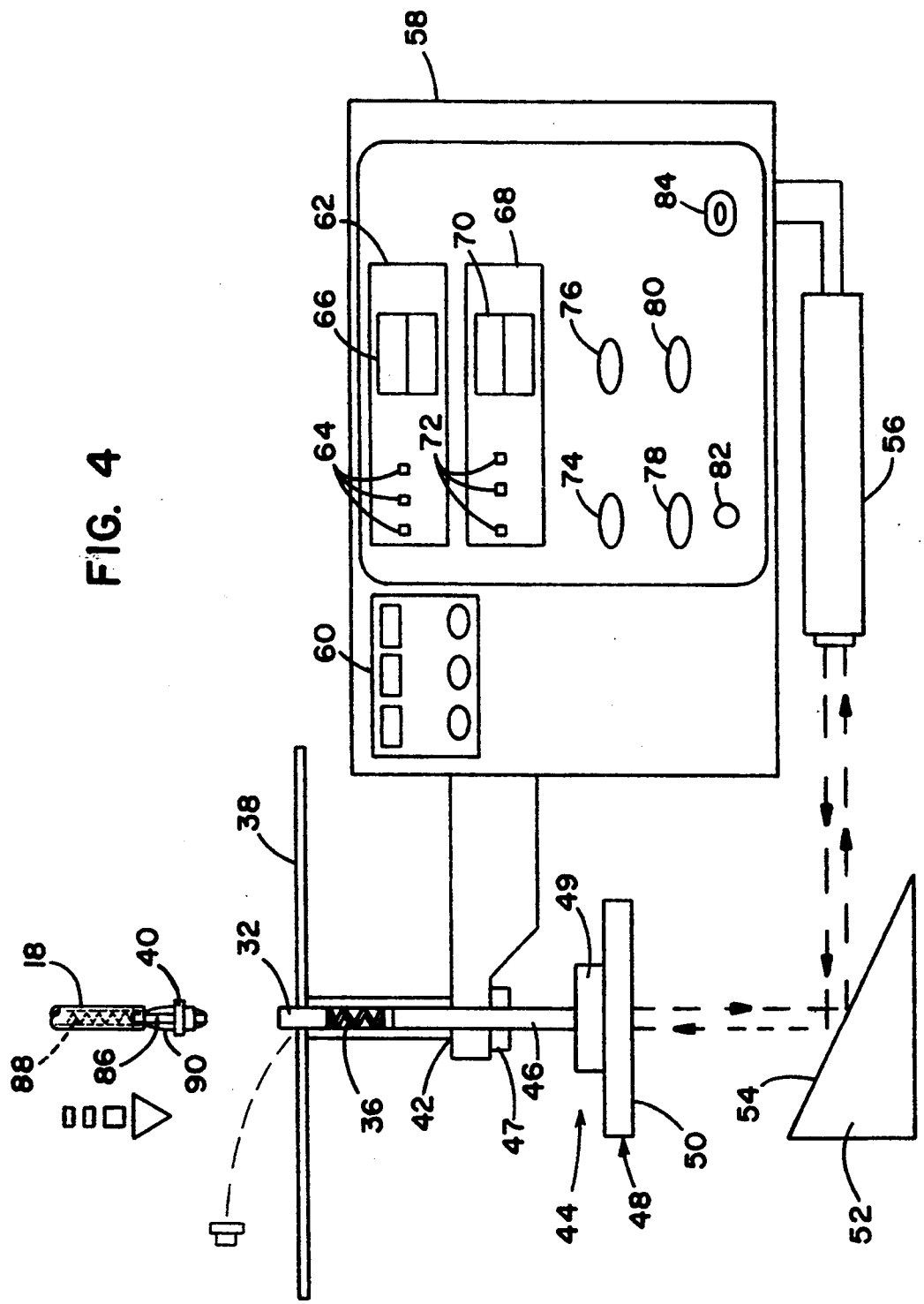
FIG. 4 is a diagrammatic representation of the detection apparatus illustrating its method of operation.

Die assembly 26 and displacement member 44 are shown in more detail in FIG. 3. Pin 32 has a first portion 33 and a second portion 35. First portion 33 projects beyond end 34 of tubular member 28. Second portion 35 is larger in diameter than first portion 33 and larger in diameter than an opening 39 through which first portion 33 extends. Second portion 35 has an annular surface 37 that contacts the inner surface (not shown) of tubular member 28 that surrounds opening 39 to retain pin 32 within member 28. Rod 46 has a cap 41 that engages second portion 35. Rod 46 extends through a hollow threaded bolt 47. Captured between bolt 47 and cap 41 is biasing spring 36. Internal threads (not shown) are provided within tubular member 28 at bottom end 42 thereof and these threads mate with the external threads on bolt 47 to secure member 28 to mounting block 30. Disk 48 has a hub member 49 that is attached to rod 46 by a set screw (not shown). While in the preferred embodiment linear displacement member 44 and pin 32 are separate components, it should be understood that alternative embodiments are also contemplated within the scope of the present invention. For example, pin 32 and member 44 could be integrally formed as a unitary linear displacement device with one end extending from tubular member 28 to be seated within a hole in workpiece 38 and an opposite end extending from member 28 to be detected by sensor 56.

Returning to FIG. 4, there is illustrated a control panel 58 which houses the electronics for processing the signal from sensor 56. Mounted in panel 58 are a number of visual readouts for the operator. First, there is a hardware counter 60 which provides a running total of the number of fasteners installed by the press. A readout 62 provides a visual indication of the signal setting for a determination that workpiece 38 is in place. A plurality of lights 64 show whether there is misalignment of workpiece 38 or whether it is properly positioned. There is also provided a numerical readout at 66 of the range of the detected signal that will indicate proper positioning of workpiece 38. Specifically, the operator can set the values on numerical readout 66 and the three indicator lights 64 provide a visual display of whether the detected signal is above, below, or within the selected range. The readout 62 is part of a conventional prior art digital meter relay with display such as the RV-41 and RV-42 digital meter relays sold by Keyence. A similar display 68 that is a part of a digital meter relay is provided to indicate fault conditions with respect to the fastener. A numerical readout 70 can be set by the operator to the range of signals that should be received by sensor 56 for a particular fastener in a particular fastener insertion operation. A plurality of indicator lights 72 provide a visual indication of whether the detected signal is above, below, or falls within the range. On the face of control panel 58 are additional indicator lights. Lights 74 and 76 are illuminated to show a "long" or a "short" fault condition as will be described in detail hereafter. A light 78 is illuminated when workpiece 38 is not aligned. A light 80 is illuminated when there is no fault condition and the fastener press operates properly. Also provided on the face of control panel 58 is a reset button 82, the function of which will be described in more detail hereafter and an on/off switch 84.

Punch assembly 18 includes a punch pilot 86 biased to an extended position by spring 88. A spring 90 carried by punch pilot 86 has portions that are bowed to diameter greater than the diameter of fastener 40 so as to grasp fastener 40 when pilot 86 enters it. A more detailed description of punch assembly 18 is found in U.S. Pat. No. 3,452,418 and is well known in the prior art. It should be understood that other well known types of punch assemblies could be used in the present invention such as a vacuum punch assembly wherein the fastener is grasped and held to the punch assembly by vacuum means.

Figure 5:
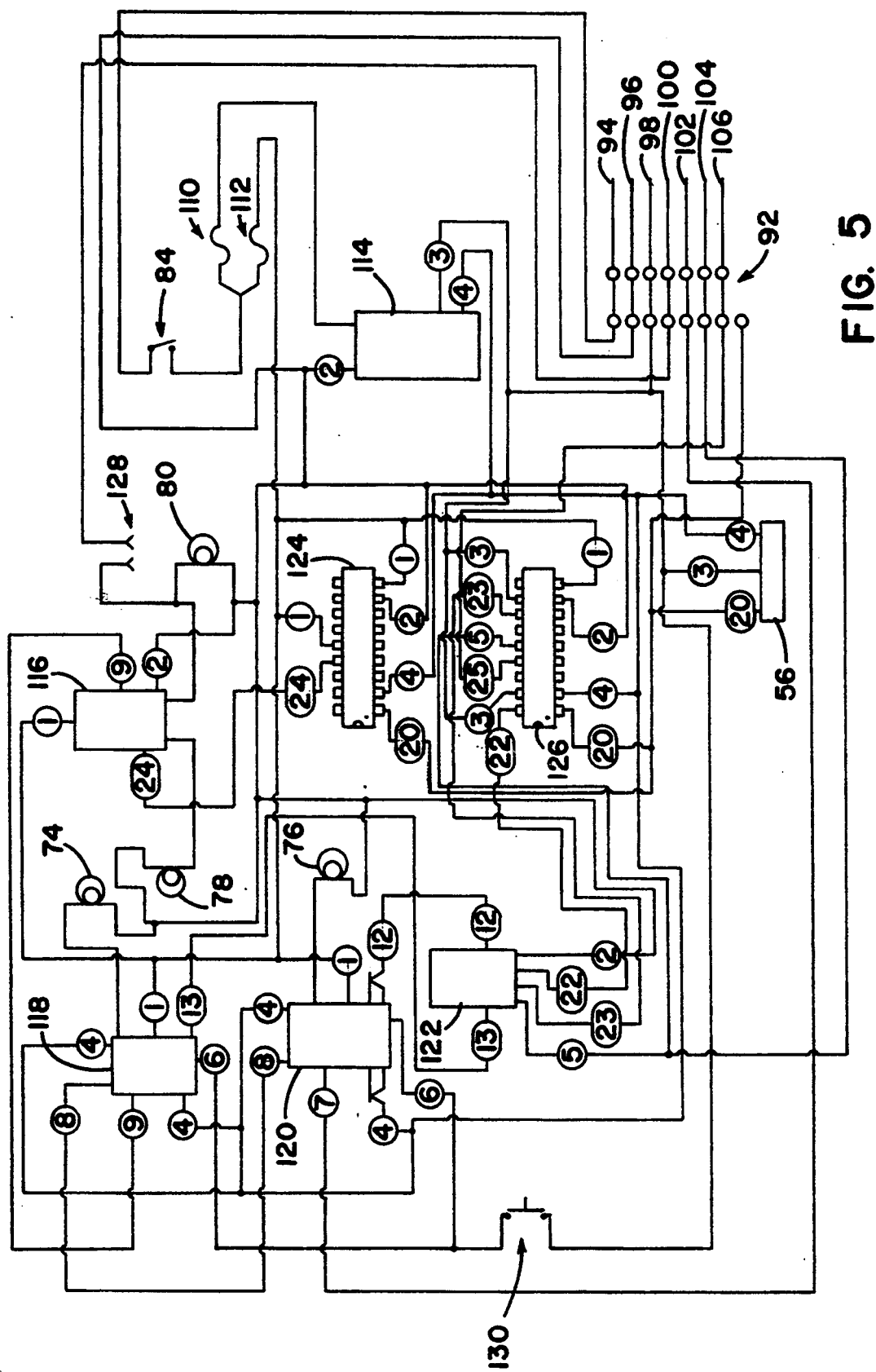
FIG. 5 is an electrical schematic of the signal processing and control circuit utilized in one embodiment of the present invention.
Figure 6A:
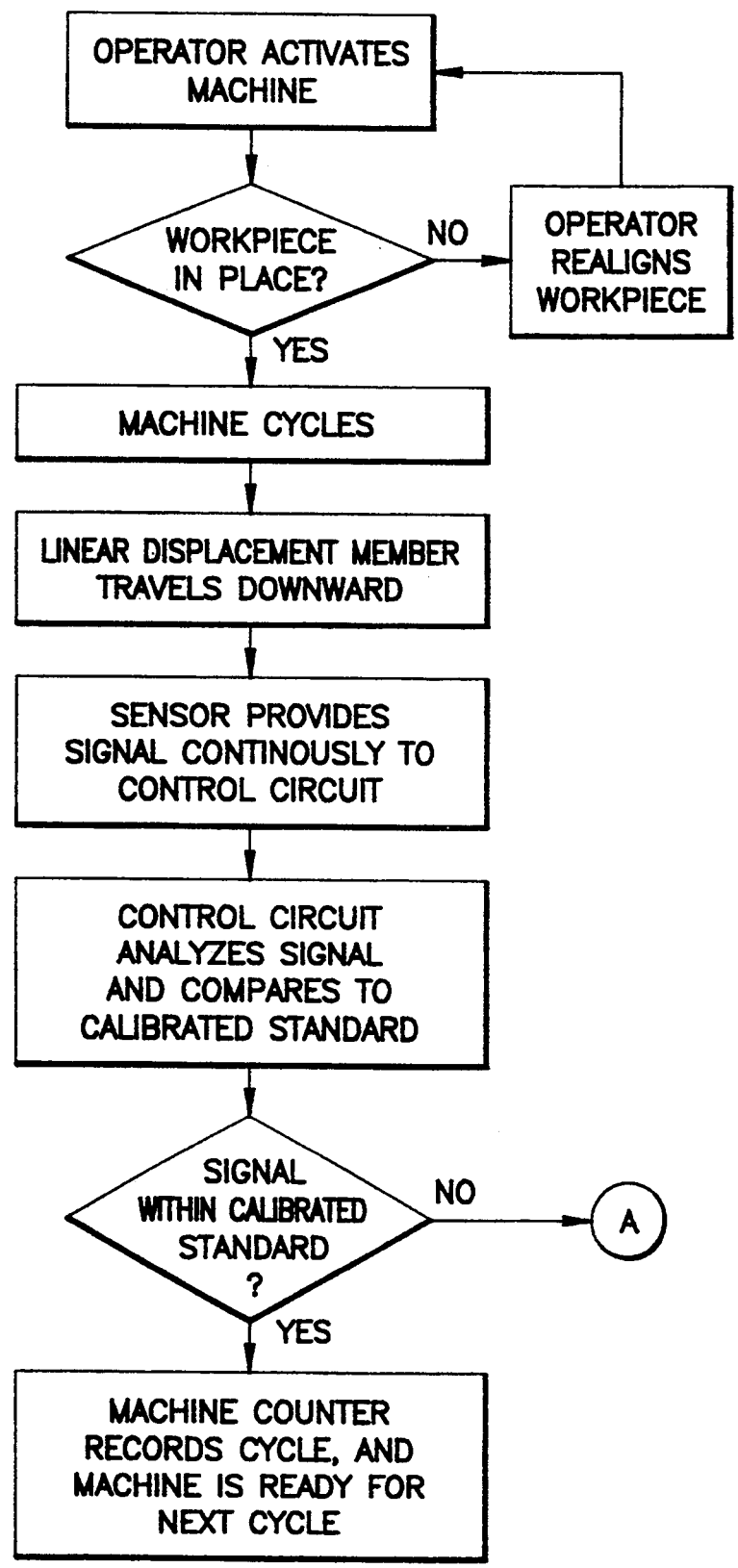
FIG. 6a and FIG. 6b depict a flow chart describing the function and operation of the detecting apparatus of the present invention.
Figure 6B:
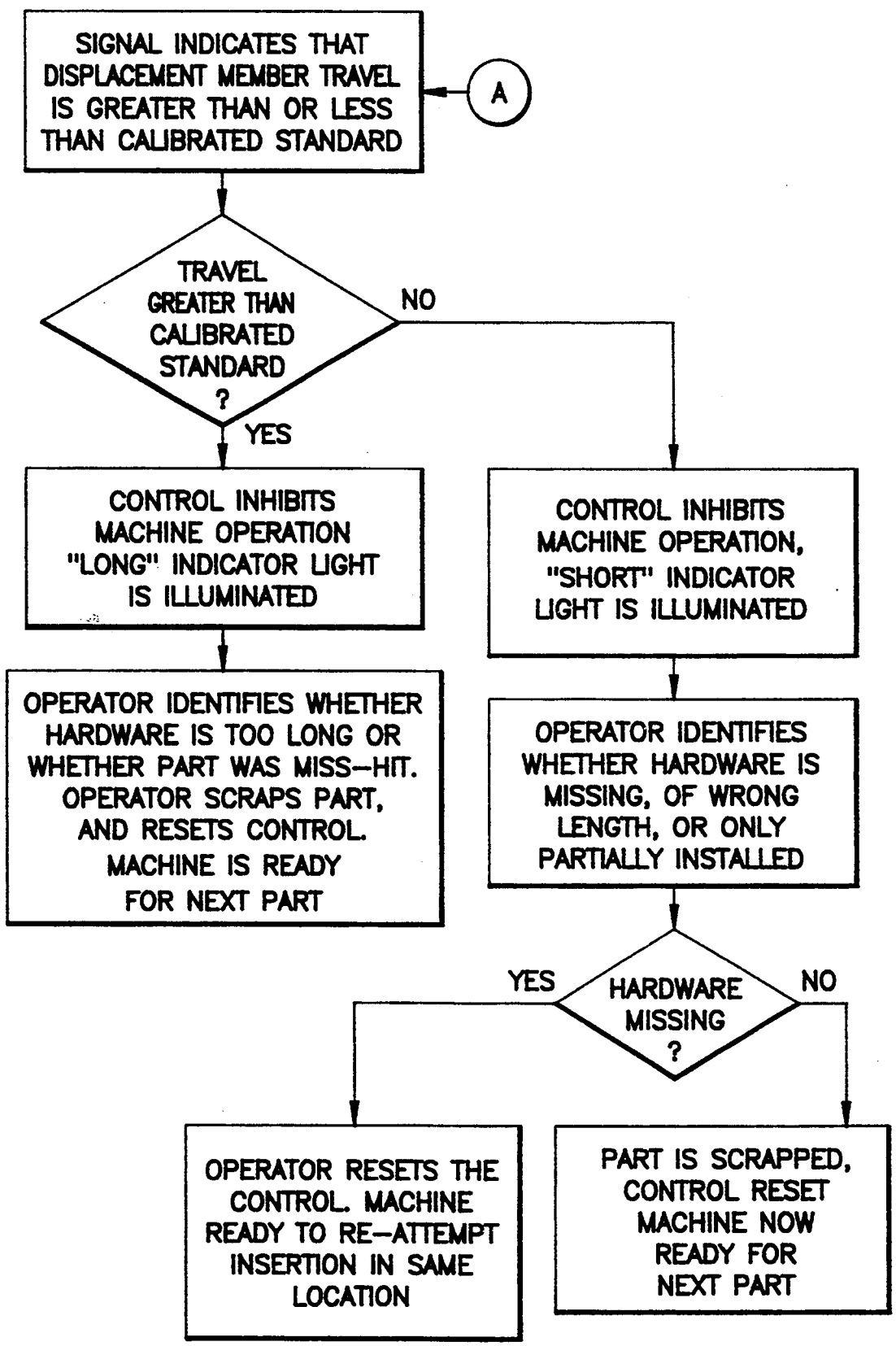

FIG. 5 is a schematic showing the preferred embodiment of the signal processing and control circuit. The processing and control circuit electrical connections to the fastener press are shown at 92. These include a pair of connections to 110 volt power supply at 94 and 96, 24 volt DC input to the fastener press at 98, a pair of foot switch contacts 100 and 102 to the fastener press, a high pressure input signal from the fastener press to the control circuit at 104 and a signal input to the hardware counter of the fastener press at 106. On/off power switch 84 is connected to a pair of fuses 110 and 112. In the preferred embodiment, fuse 110 is a 0.5 amp 250 volt fuse and fuse 112 is a 3 amp 250 volt fuse. The 110 volt power is supplied through fuse 110 to a 24 volt DC regulated power supply 114. The 110 volt power is also supplied to the sensor processing and control circuit through fuse 112. The connections of the 110 volt power at the various locations in the circuit is illustrated at 1 with the neutral of the power supply as indicated at 2. A double throw relay 116 functions as the "not aligned" relay to signal whether workpiece 38 is properly positioned for hardware placement. Relay 116 in the preferred embodiment is available from Dayton and has a model designation 5X827E. A 24 volt DC latching relay 118 functions in connection with the indication of a "long" fault condition as will be described in more detail hereafter, and a 24 volt DC latching relay 120 functions as an indicator of a "short" fault condition. Relays 118 and 120 in the preferred embodiment are available from Potter and Bruinfield having the model designations KUL-11D15D-24. A third relay 122 is a 120 volt "on" delay relay which in the preferred embodiment is set for a delay at 0.37 seconds. Relay 122 is available from Dayton and has the model designation 6A852. A digital meter relay 124 is associated with the determination of the proper placement of workpiece 38. A digital meter relay 126 is associated with the indication of the "short" or "long" fault condition. Digital meter relays 124 and 126 are standard and commercially available from Keyence having the model designations RV-41 and RV-42. A foot switch connector is indicated at 128. Sensor 56 is powered by 24 volt DC from regulated power supply 114 as shown by the connections indicated at 3 and 4. The sensor output which is a voltage use is indicated at terminal 20 and is provided as an input to digital meter relay 126 and digital meter relay 124. A reset switch 130 is connected between the 24 volt DC output of regulated power supply 114 and reset inputs to relays 118 and 120 as indicated at the terminal 6. Workpiece alignment indicator lamp 78 is connected to relay 116 and to the negative or neutral terminal of the 110 volt power supply. "Long" fault condition lamp 74 is connected to an output of relay 118 and also to the negative or neutral of the 110 volt power supply. "Short" fault condition indicator lamp 76 is connected to the output of relay 120 and to the negative or neutral terminal of the 110 volt power supply. Proper operating condition lamp 80 is connected to foot switch connector 128 and to the negative or neutral of the 110 volt power supply.

Digital meter relay 126 has a "short" signal output at 22 which is an input to relay 122. The "short" output signal is a 24 volt DC analog signal. Digital meter relay 126 has a "long" output signal at 23 which is also an input to relay 122. This is also a 24 volt DC analog output. An output at 25 from digital meter relay 126 is an input to the counter of the fastener as indicated at the terminal 106. Another input to relay 126 is the high pressure signal from terminal 102 as indicated at 5. This signal is also the input to relay 122. Digital meter relay 124 has an output as indicated at 24 that provides the signal indicating whether workpiece 38 is properly aligned. This means whether or not pin 32 is seated within and extends through a pre-punched hole in workpiece 38. This output signal from relay 124 is an input to relay 116.

"On" delay relay 122 has an output at 13 which is connected to the "long" fault relay 118. Relay 122 has an output at 12 that is connected to the "short" fault condition relay 120. An output at 9 from relay 116 is connected as an input to relay 118 that has an output at 8 connected as an input to relay 120. Relay 120 has an output at 7 which is connected to the foot switch contact for the fastener press at 102.

The operation of the present invention will now be described. With no fault condition existing from a previous operation, the operator places workpiece 38 with pin 32 extending through a pre-punched hole. With pin 32 fully extended in the pre-punched hole, the signal from sensor 56 that is the input to digital meter relay 124 will be within the proper pre-set range indicating that workpiece 38 is in place. An output signal at 24 activates relay 116. This turns on the lamp 80 indicating that workpiece 38 is in the proper position for hardware placement. If workpiece 38 is not in the proper position, for example, if it is laying on pin 32 causing pin 32 to be displaced downwardly, the output signal from sensor 56 provided as the input to digital meter relay 124 will be out of the permissible range and there will be no output signal at 24. In that case, relay 116 is turned off which energizes the lamp 78 and inhibits the operation of the foot switch.

If workpiece 38 is in the proper position and the previous press operation has not resulted in a fault condition, a "go" signal will be transmitted from relay 116 through relays 118 and 120 to the fastener press foot switch at 102. This path of electrical continuity allows the press to operate to insert a fastener when the operator manually actuates the foot switch.

When the foot switch is manually actuated, a high pressure signal indicating the beginning of the operation is provided as the input to delay relay 122. As previously indicated, relay 122 is set to have a delay of about 0.37 seconds. This delay is to ensure that relay 122 is monitoring the "short" or "long" input signals at 22 and 23 at the appropriate period of time after initiation of the press operation. In other words, the purpose of the delay relay is to delay the operation of the fault detection until punch assembly 18 with fastener 40 has traveled in its downward stroke to a position where the fault detection is designed to occur.

The following discussion will assume a "short" fault condition. A short condition may occur when there is missing hardware, i.e., when feed hopper 20 is empty so that no fastener is provided by gate assembly 24 to punch assembly 18. A "short" condition may also occur if the hardware falls off punch assembly 18 during its downward stroke or if a fastener of improper length, i.e. shorter than required, is used. Under any one of these sets of fault conditions pin 32 will not be depressed the proper distance and accordingly linear displacement member 44 will not travel the appropriate distance along its axis of reciprocal movement. This will affect the signal output of sensor 56. A "short" signal output from digital meter relay 126 generates a "short" signal at 12 output from delay relay 122 which is an input to relay 120. This causes relay 120 to latch "on" illuminating alarm lamp 76 and disconnecting the output at 7 of relay 120 from its input at 8. This interrupts the path of electrical continuity to the switch terminal 102 so that subsequent operation of the press by the operator actuating the foot switch is disabled. Thus, the operator cannot proceed to the next pre-punched hole in workpiece 38 without resetting the control circuit using reset switch 130. This inhibition of further operation along with the alarm lamp 76 provides the operator with an indication of a fault condition that must be corrected.

The following discussion will assume a "long" fault condition. A "long" fault condition can occur when the hardware is the wrong size, i.e., too long, or when there is a miss-hit of the punch assembly that causes metal from workpiece 38 to be driven into contact with pin 32 along with fastener 40. As can be appreciated this fault condition also effects the travel of pin 32 and consequently the position of linear displacement member 44 along its axis of reciprocal movement. A "long" fault condition signal output from relay 126 is the input at 23 to delay relay 122. Upon receipt of a "long" fault condition at relay 122 there is an output at 13 which is the input to relay 118. The signal latches relay 118 "on" illuminating alarm lamp 74 and breaking the electrical continuity with foot switch 102 thereby also inhibiting the operation of the press. Again, the operator cannot proceed to a subsequent operation without manually resetting the sensor control circuit using reset switch 130.

In its operation without fault occurring, digital meter relay 126 has an output signal at 25 which is the input to the hardware counter at 106. Thus counter display 60 will provide a readout only of non-fault hardware placement operations.

FIGS. 5A and 5B illustrate in block diagram form the operation of the present invention. First, the operator activates the fastener press including turning on power switch 84. The operator then determines whether or not workpiece 38 is in place. If not, workpiece 38 is re-aligned. If workpiece 38 is in place, the operator manually actuates the foot switch. In response to the movement of pin 32 linear displacement member 44 travels downward. Sensor 56 provides an analog signal continuously to the control circuit. The control circuit analyzes the signal generated by sensor 56 and compares the signal to a calibrated standard. If the signal is within the calibrated standard, there has been a proper placement of fastener 40 in workpiece 38. The counter records the operation and the machine is ready for the next cycle. If the signal from sensor is not within the calibrated standard, it means that the signal indicates that the travel of displacement member 44 is greater or less than the pre-set standard. If the travel is greater than the calibrated standard, the control circuit inhibits machine operation and the "long" indicator light is illuminated. The operator than identifies whether the hardware is too long or whether the part was miss-hit. Upon correction of the problem, the operator resets the control and the machine is ready for the next operation. If the travel is less than a calibrated standard, the control again inhibits the machine operation and a "short" indicator light is illuminated. The operator then identifies whether the hardware is missing, of the wrong length, or improperly installed on punch assembly 18. If the hardware is missing, the operator resets the control and the machine is then ready to reattempt insertion of a fastener in the same location. If there is something wrong with the fastener or the hardware it may be scrapped, the control reset and the machine is then ready for the next part.

From the above description, it can be appreciated that the present invention solves many of the problems associated with the prior art automated fastener press. In particular, it automatically detects whether the press is operating properly or whether there is a fault condition. Moreover, upon detection of a fault condition, the press is inhibited from further operation requiring the operator to address the fault condition and reset the machine. The present invention thus significantly reduces the chance that a workpiece, defective because of missing or improper hardware, will occur.

What is claimed is:

1. Apparatus for detecting fault conditions in the operation of a fastener press of the type having a punch assembly for inserting a fastener into a hole in a workpiece comprising:

(a) A workpiece die having a retractable pin aligned generally with said punch assembly and mounted for reciprocal movement along an axis of said die;
   (b) spring means biasing said pin toward a first extended position to be received within the hole in said workpiece;
   (c) a linear displacement member operatively connected to said pin so that said linear displacement member moves along said axis in concert with the reciprocal movement of said pin;
   (d) a sensor disposed to detect the position of said linear displacement member and generate a signal representative of said position, and
   (e) means connected to said sensor for processing said signal and generating fault indication when a fault condition exists.

2. A fault detection apparatus in accordance with claim 1 wherein said workpiece die comprises a tubular member having first and second ends with said pin extending from said first end and said linear displacement member extending from said second end.

3. A fault detection apparatus in accordance with claim 2 wherein said linear displacement member further comprises:
   a rod slidably received within said tubular member having a first end in contact with said pin and a second end extending from said second end of said tubular member.

4. A fault detection apparatus in accordance with claim 3 wherein said rod is mounted in said tubular member by a hollow fastener received with said second end of said tubular member with said rod extending through said fastener.

5. A fault detection apparatus in accordance with claim 4 wherein said rod has a cap member at said first end thereof in contact with said pin and said spring means comprises a coiled spring through which said rod extends, said spring captured between said cap and said fastener.

6. A fault detection apparatus in accordance with claim 2 wherein said sensor further comprises a proximity sensor generating a signal that is reflected from said linear displacement member and detected by said sensor.

7. A press for inserting fasteners into a workpiece comprising:
   a reciprocating punch assembly;
   (b) dispensing means for delivering fasteners into the path of said reciprocating punch assembly;
   (c) a workpiece die having a retractable pin aligned generally with said punch assembly and mounted for reciprocal movement along an axis of said die;
   (d) a spring means biasing said pin toward a first extended position to be received within a hole in said workpiece;
   (e) a linear displacement member operatively connected to said pin so that said linear displacement member moves along said axis in concert with the reciprocal movement of said pin;
   (f) a sensor disposed to detect the position of said linear displacement member and generate a signal representative of said position, and
   (g) means connected to said sensor for processing said signal and generating a fault indication when a fault condition exists.

8. Apparatus for detecting fault conditions in the operation of a fastener press of the type having a punch assembly for inserting a fastener into a hole in a workpiece comprising:
- (a) a workpiece die aligned generally with said punch assembly, said die comprising a tubular member with first and second ends;
- (b) a linear displacement device mounted within said tubular member for reciprocal movement along the longitudinal axis of said tubular member, said linear displacement device having a first end adapted to be received within a hole in said workpiece when said first end is in an extended position from said first end of said tubular member, the position of said linear displacement device representing whether or not a fault condition occurs in the operation of the press;
- (c) spring means for biasing said linear displacement device toward said extended position so that said first end is engaged by said punch assembly during the fastener insertion stroke of said punch assembly;
- (d) means for detecting the position of said linear displacement device along the longitudinal axis of said tubular member and generating fault indication whenever a fault condition exists.

9. A fault detection apparatus in accordance with claim 8 wherein said linear displacement device has a second end extending from said second end of said tubular member and wherein said detecting means further comprises a proximity sensor disposed to detect the position of said second end and generate a signal representing said position and a signal processing means connected to said sensor and generating a fault indication in response to said signal when a fault condition exists.

* * * * *